(12) United States Patent
Oswald

(10) Patent No.: US 7,667,733 B1
(45) Date of Patent: Feb. 23, 2010

(54) COMPUTER MONITOR RECEIVER

(76) Inventor: David L. Oswald, 2313 S. Roosevelt Ave., Sioux Falls, SD (US) 57106

( * ) Notice: Subject to any disclaimer, the term of this patent is extended or adjusted under 35 U.S.C. 154(b) by 1235 days.

(21) Appl. No.: 10/622,938

(22) Filed: Jul. 18, 2003

(51) Int. Cl.
H04N 9/47 (2006.01)
H04N 7/173 (2006.01)

(52) U.S. Cl. ........................ 348/151; 725/127

(58) Field of Classification Search .......... 348/151, 348/161; 725/28, 30, 127, 95; 709/224, 709/229; 399/8; 434/308; 345/738
See application file for complete search history.

(56) References Cited

U.S. PATENT DOCUMENTS

| 5,338,252 A | 8/1994 | Bowler et al. |
| 5,349,675 A | 9/1994 | Fitzgerald et al. |
| 5,374,940 A | 12/1994 | Corio |
| 5,604,509 A | 2/1997 | Moore et al. |
| 5,732,212 A | 3/1998 | Perholtz et al. |
| 5,832,212 A | 11/1998 | Cragun et al. |
| 5,835,722 A | 11/1998 | Bradshaw et al. |
| 5,923,361 A * | 7/1999 | Sutton, Jr. ................ 725/93 |
| 5,949,415 A | 9/1999 | Lin et al. |
| 5,961,604 A * | 10/1999 | Anderson et al. ............ 709/229 |
| 5,987,611 A | 11/1999 | Freund |
| 5,990,582 A | 11/1999 | Henderson et al. |
| 6,023,507 A | 2/2000 | Wookey |
| 6,047,060 A | 4/2000 | Fedorov et al. |
| 6,233,428 B1 * | 5/2001 | Fryer .......................... 434/308 |
| 6,239,833 B1 | 5/2001 | Ozaki et al. |
| 6,282,383 B1 * | 8/2001 | Weinberger et al. ............ 399/8 |
| 6,446,119 B1 * | 9/2002 | Olah et al. .................. 709/224 |
| 6,522,309 B1 | 2/2003 | Weber |
| 2002/0180781 A1 * | 12/2002 | Cezeaux et al. ............. 345/738 |
| 2006/0218575 A1 * | 9/2006 | Blair ........................... 725/28 |

* cited by examiner

*Primary Examiner*—Gims S Philippe
(74) *Attorney, Agent, or Firm*—Jeffrey A. Proehl; Woods, Fuller, Shultz & Smith PC

(57) ABSTRACT

A computer monitor receiver for monitoring children's internet usage. The computer monitor receiver includes a video tap assembly operationally coupled between a video output and a video display device of an information handling system for routing a monitoring video signal, a signal transmission assembly for conditioning the monitoring video signal for transmission through a propagation channel, a receiver assembly for conditioning a signal received through the propagation channel and a video presentation device for displaying a real time substantially identical image of the video provided to a user being monitored.

17 Claims, 3 Drawing Sheets

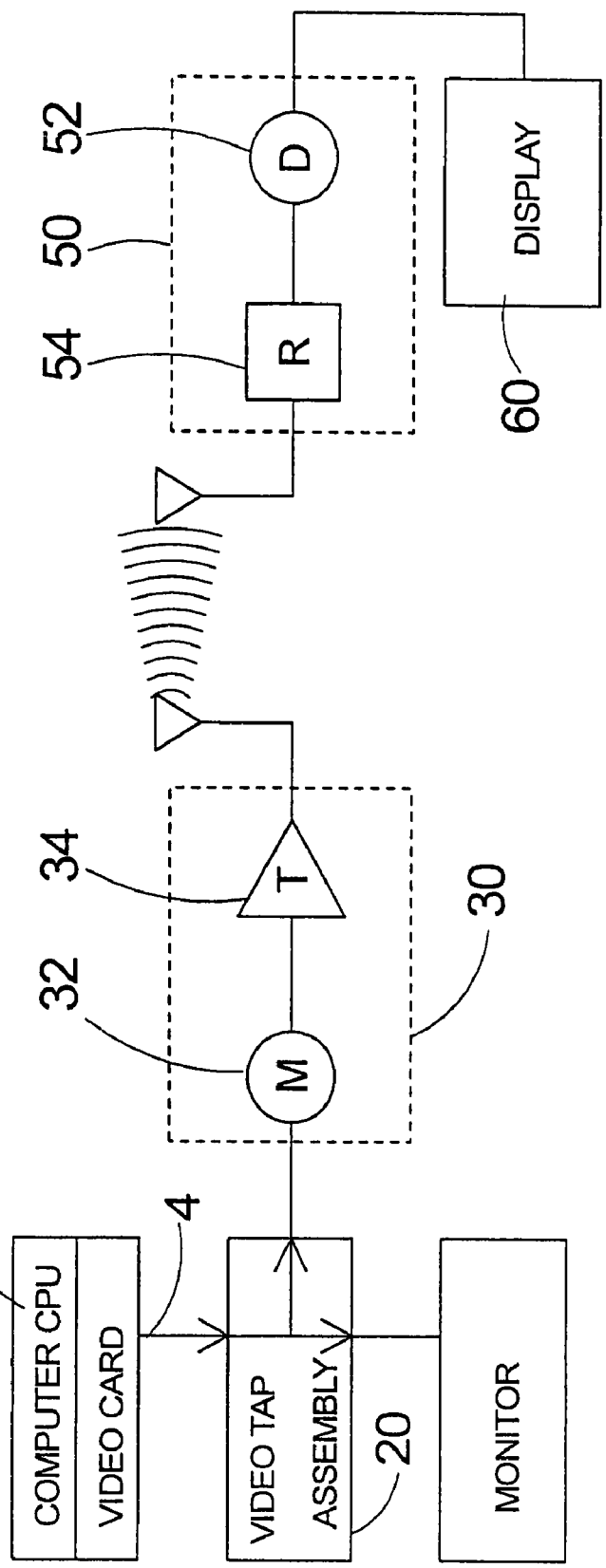

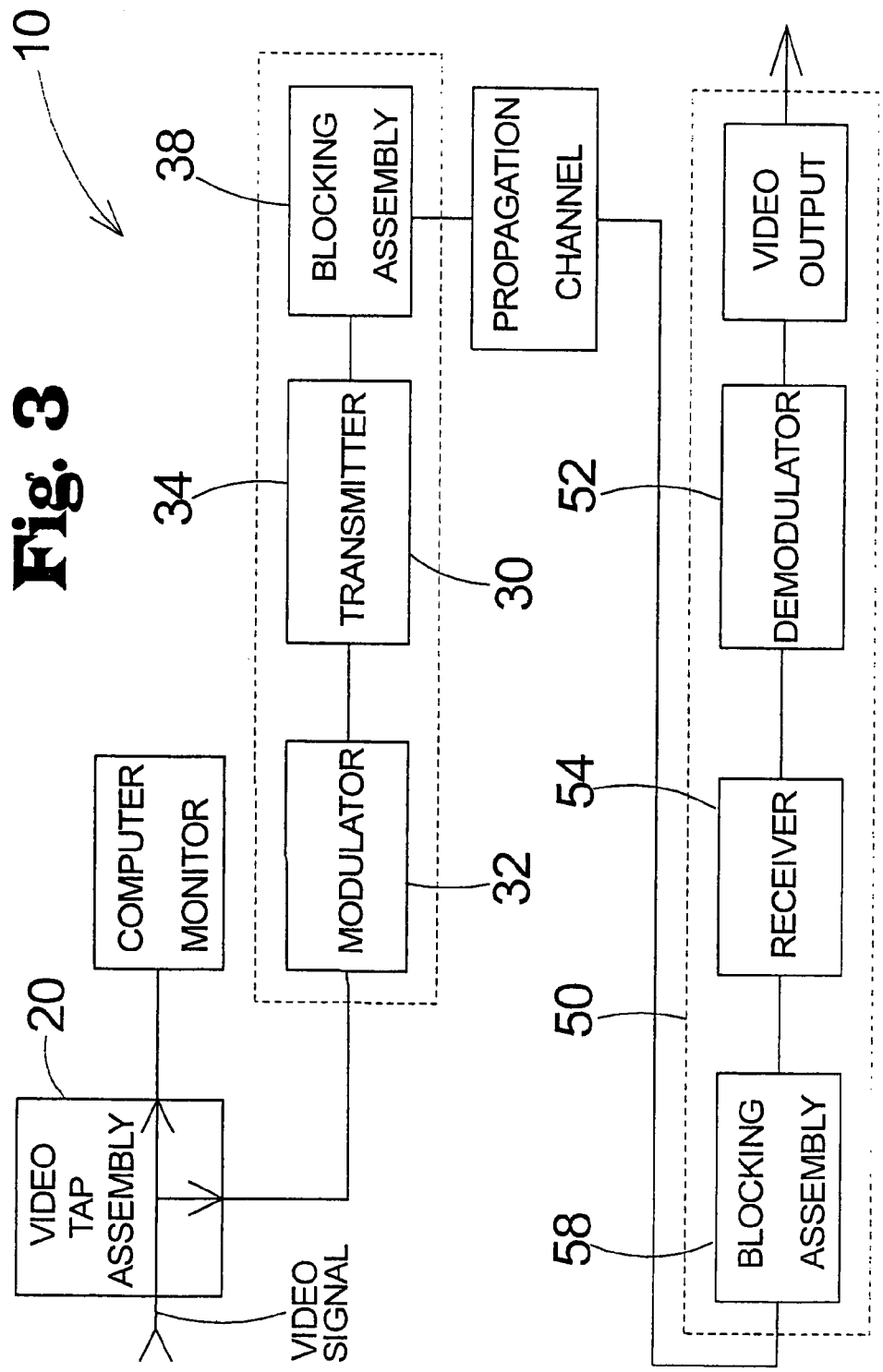

COMPUTER MONITOR RECEIVER

BACKGROUND OF THE INVENTION

1. Field of the Invention

The present invention relates to computer monitoring devices and more particularly pertains to a new computer monitor receiver for monitoring children's internet usage.

2. Description of the Prior Art

The use of computer monitoring devices is known in the prior art. More specifically, computer monitoring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,604,509; U.S. Pat. No. 5,990,582; U.S. Pat. No. 6,522,309; U.S. Pat. No. 5,374,940; U.S. Pat. No. 6,446,119; U.S. Pat. No. 6,239,833; U.S. Pat. No. 6,047,060; U.S. Pat. No. 5,349,675; U.S. Pat. No. 5,338,252; U.S. Pat. No. 5,732,212; U.S. Pat. No. 5,832,212; U.S. Pat. No. 5,835,722; U.S. Pat. No. 5,949,415; U.S. Pat. No. 6,023,507; and U.S. Pat. No. 5,987,611.

While these devices fulfill their respective, particular objectives and requirements, the aforementioned patents do not disclose a new computer monitor receiver. The inventive device includes a video tap assembly operationally coupled between a video output and a video display device of an information handling system for routing a monitoring video signal, a signal transmission assembly for conditioning the monitoring video signal for transmission through a propagation channel, a receiver assembly for conditioning a signal received through the propagation channel and a video presentation device for displaying a real time substantially identical image of the video provided to a user being monitored.

In these respects, the computer monitor receiver according to the present invention substantially departs from the conventional concepts and designs of the prior art, and in so doing provides an apparatus primarily developed for the purpose of monitoring children's internet usage.

SUMMARY OF THE INVENTION

In view of the foregoing disadvantages inherent in the known types of computer monitoring devices now present in the prior art, the present invention provides a new computer monitor receiver construction wherein the same can be utilized for monitoring children's internet usage.

The general purpose of the present invention, which will be described subsequently in greater detail, is to provide a new computer monitor receiver apparatus and method which has many of the advantages of the computer monitoring devices mentioned heretofore and many novel features that result in a new computer monitor receiver which is not anticipated, rendered obvious, suggested, or even implied by any of the prior art computer monitoring devices, either alone or in any combination thereof.

To attain this, the present invention generally comprises a video tap assembly operationally coupled between a video output and a video display device of an information handling system for routing a monitoring video signal, a signal transmission assembly for conditioning the monitoring video signal for transmission through a propagation channel, a receiver assembly for conditioning a signal received through the propagation channel and a video presentation device for displaying a real time substantially identical image of the video provided to a user being monitored.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer monitor receiver apparatus and method which has many of the advantages of the computer monitoring devices mentioned heretofore and many novel features that result in a new computer monitor receiver which is not anticipated, rendered obvious, suggested, or even implied by any of the prior art computer monitoring devices, either alone or in any combination thereof.

It is another object of the present invention to provide a new computer monitor receiver which may be easily and efficiently manufactured and marketed.

It is a further object of the present invention to provide a new computer monitor receiver which is of a durable and reliable construction.

An even further object of the present invention is to provide a new computer monitor receiver which is susceptible of a low cost of manufacture with regard to both materials and labor, and which accordingly is then susceptible of low prices of sale to the consuming public, thereby making such computer monitor receiver economically available to the buying public.

Still yet another object of the present invention is to provide a new computer monitor receiver which provides in the apparatuses and methods of the prior art some of the advantages thereof, while simultaneously overcoming some of the disadvantages normally associated therewith.

Still another object of the present invention is to provide a new computer monitor receiver for monitoring children's internet usage or the internet usage of persons of concern such as those with diminished capacity.

Yet another object of the present invention is to provide a new computer monitor receiver which includes a video tap assembly operationally coupled between a video output and a video display device of an information handling system for routing a monitoring video signal, a signal transmission assembly for conditioning the monitoring video signal for transmission through a propagation channel, a receiver assembly for conditioning a signal received through the propagation channel and a video presentation device for displaying a real time substantially identical image of the video provided to a user being monitored.

Still yet another object of the present invention is to provide a new computer monitor receiver that provides real-time monitoring of video information being presented to a child or other user being monitored, even when engaged in other activities requiring the parent or person monitoring usage to be in another room.

Even still another object of the present invention is to provide a new computer monitor receiver that does not rely on blocking software, firewalls, or logging system for inhibiting access to prohibited or undesirable cites.

A further object of the present invention is to provide a new computer monitor receiver that allows monitoring of a child's computer usage of allowed cites to insure that unwanted messages, inappropriate or predatory contact are stopped and corrective steps can be taken to protect child users.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic functional interconnect diagram of the present invention.

FIG. 3 is a schematic signal flow diagram of the present invention.

DESCRIPTION OF THE PREFERRED EMBODIMENT

Figure 1:
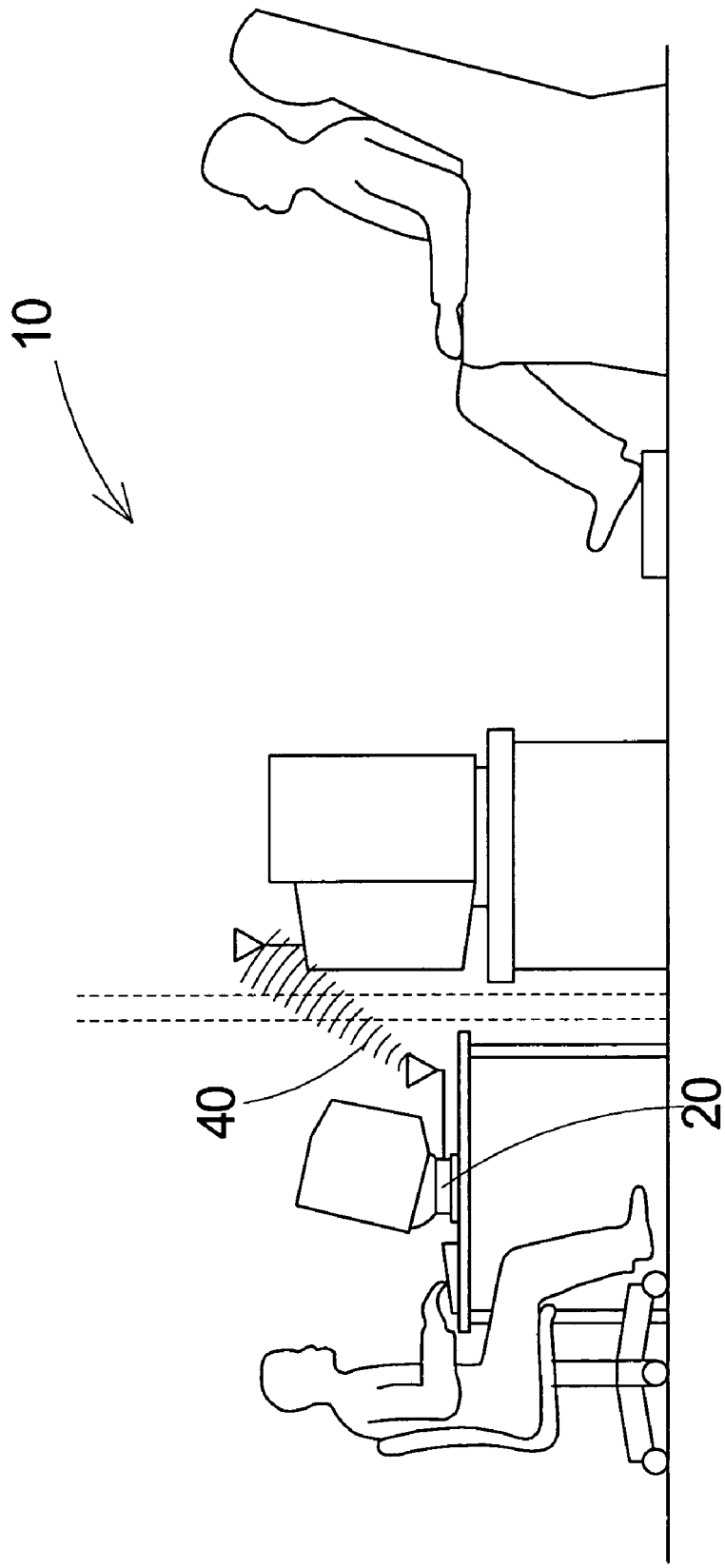
FIG. 1 is a schematic view of a new computer monitor receiver in use according to the present invention.

With reference now to the drawings, and in particular to FIGS. 1 through 3 thereof, a new computer monitor receiver embodying the principles and concepts of the present invention and generally designated by the reference numeral 10 will be described.

As best illustrated in FIGS. 1 through 3, the computer monitor receiver 10 generally comprises a video tap assembly 20, a signal transmission assembly 30, a propagation channel 40, a receiver assembly 50, and a video presentation (display) means 60.

The video tap assembly 20 is used for operationally coupling to a video output 4 of the information handling system 2. The video tap assembly 20 provides a monitoring video signal containing information substantially identical to a video signal provided by the video output 4 of the information handling system 2.

The signal transmission assembly 30 is operationally coupled to the video tap assembly 20. The signal transmission assembly 30 conditions the monitoring video signal for transmission through the propagation channel 40. The signal transmission assembly 30 is operationally coupled to the propagation channel 40.

The receiver assembly 50 is also operationally coupled to the propagation channel 40 for receiving a signal propagated from the signal transmission assembly 30 through the propagation channel 40. The receiver assembly 50 conditions the received signal for recovering information substantially identical to the video signal from the information handling system 2.

The video presentation means 60 is operationally coupled to the receiver assembly 50 for presenting video information to a monitoring user substantially identical to information presented by the information handling system 2 to the user being monitored.

The propagation channel 40 may be free space, coaxial cable, in-situ household ac wiring, in-situ household telephone wiring, in-situ cable television wiring, or fiber optic cable.

The video presentation means 60 may be a television, computer monitor, video monitor, PDA device, laptop computer system, or video recording device.

In a preferred embodiment, the signal transmission assembly 30 further includes, a modulator 32 for impressing the monitoring video signal upon a carrier signal; and a transmitter 34 operationally coupled to the modulator 32 to facilitate propagation to the receiver assembly 50. Similarly, the receiver assembly 50 further includes a receiver 54 for converting the signal received from the signal transmission assembly 30 through the propagation channel 40; a demodulator assembly 52 operationally coupled to the receiver 54 for demodulating the propagated signal into a received signal; and a video output 56 operationally coupled to the demodulator assembly 52 for facilitating routing of received signal to a video presentation means 60.

The system may also include a pair of blocking assemblies 38,58. Each one of said blocking assemblies 38,58 is operationally coupled to an associated one of the signal transmission assembly 30 and the receiver assembly 50. Each one of said pair of blocking assemblies 38,58 is for facilitating coupling the signal transmission assembly 30 and receiver assembly 50 to the propagation channel 40 when the propagation channel 40 also routes other signals unassociated with the system 10.

In an embodiment, the blocking assemblies 38,58 are designed for filtering out undesired rf signals.

In another embodiment, the blocking assemblies 38,58 facilitate blocking power signals from conventional household electrical lines, facilitating use of these lines as the propagation channel 40 between the signal transmission assembly 30 and the receiver assembly 50.

In still another embodiment the blocking assemblies 38,58 are designed for using conventional telephone lines as a propagation channel 40 on a non-interference basis with conventional telephone signaling.

In yet another embodiment the blocking assemblies 38,58 are designed for using conventional catv lines as a propagation channel 40 on a non-interference basis with conventional catv signaling.

Further, the present system anticipates that the use of various methods of securing the information being transmitted through the propagation channel may be required. These methods may include, but certainly are not limited to: encryption, time division multiple access techniques, frequency division multiple access techniques, frequency hopping, and direct sequence spreading. Additionally, the output power associated with the transmitter may be adjusted to limit the probability of unintended interception or interference.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote video computer monitoring system for use with computing systems, comprising:
    a video tap assembly for tapping a video signal routed from a video output of a computer to a monitor, said video tap assembly splitting off a portion of the video signal while allowing a second portion of the video signal to pass through to the monitor;
    a transmitter assembly operationally coupled to said video tap assembly, said transmitter assembly propagating said portion of the video signal as a propagated signal; and
    a monitoring assembly for receiving said propagated signal and presenting a visual representation of the video signal to a user;
    wherein said monitoring assembly further comprises:
        a receiver assembly for receiving said propagated signal from said transmitter assembly;
        a demodulator assembly operationally coupled to said receiver assembly for demodulating said propagated signal into a received signal; and
        a video output operationally coupled to said demodulator assembly for facilitating routing of received signal to a video display means;
    wherein said video display means further comprises a video display unit selected from the group of video display units consisting of a television, a video monitor, a computer monitor, and a personal data assistant (PDA);
    wherein said monitoring assembly facilitates radio frequency reception.

2. The system of claim 1, further comprising a receiver ac blocking assembly operationally coupled to said receiver assembly, said receiver ac blocking assembly facilitating reception through household electrical lines.

3. The system of claim 1, wherein said receiver assembly being for demodulating said propagated signal from telephone lines on a non-interference basis with telephone signaling.

4. The system of claim 1, wherein said receiver assembly being for demodulating said propagated signal from catv lines on a non-interference basis with catv signaling.

5. A method of remotely monitoring children's internet usage comprising:
    providing a video tap device couplable to an information handling system between a video output and a video display device, said video tap allowing a video signal from the information handling system to pass through said video tap substantially unimpeded while providing a monitoring video signal which is substantially identical to the video signal presented to the video display device;
    providing a propagation channel;
    providing a signal transmission assembly for conditioning said monitoring video signal for transmission through said propagation channel, said signal transmission assembly being operationally couplable to said propagation channel;
    providing a receiver assembly operationally couplable to said propagation channel;
    providing a video presentation means operationally couplable to said receiver assembly, said video presentation means converting a signal received from said receiver assembly into a presentation of video information substantially identical to the video signal presented to the video display device by the information handling system;
    coupling said video tap assembly between the video output of the information handling system and the video display device;
    coupling said video tap assembly to said signal transmission assembly;
    coupling said signal transmission assembly to said propagation channel;
    coupling said receiver assembly to said propagation channel;
    coupling said receiver assembly to said video presentation means; and
    visually observing said video presentation means whereby internet access of a user utilizing the information handling system may be monitored by a monitoring user.

6. The method of claim 5, further including providing a pair of blocking assemblies, each one of said blocking assemblies being operationally coupled to an associated one of said signal transmission assembly and said receiver assembly, each one of said pair of blocking assemblies being for facilitating coupling said signal transmission assembly and said receiver assemblies to said propagation channel when said propagation channel also routes other signals unassociated with said system.

7. The method of claim 5, further including a securing means for inhibiting unauthorized observation of said monitoring video signal.

8. A remote video computer monitoring system for monitoring video signals sent from a computer to a display monitor, the system comprising:
    a video tap assembly configured to monitor an original video signal sent from a video output of a computer to a first display monitor to cause the first display monitor to display video images, the video tap assembly being configured to produce a secondary video signal corresponding to the original video signal while allowing the original video signal to pass through to the display monitor;
    a transmitter assembly operationally coupled to said video tap assembly in a manner suitable to receive said secondary video signal from said video tap assembly, and said transmitter assembly being configured to propagate the secondary video signal as a propagated signal; and a monitoring assembly configured to receive the propagated signal at a location remote from the transmitter assembly, the monitoring assembly producing a video output representative of the original video signal such that the video output produces video images on a second display monitor corresponding to the video images displayed on the first display monitor.

9. The system of claim 8 wherein the transmitter assembly and monitoring assembly include means for transmitting and receiving the propagated signal therebetween wirelessly over free space.

10. The system of claim 8 wherein the transmitter assembly and monitoring assembly include means for transmitting and receiving the propagated signal therebetween through household alternating current (AC) power wires.

11. The system of claim 8, wherein said transmitter assembly further comprises:
    a modulator for impressing said portion of the video signal upon a carrier signal; and
    a transmitter operationally coupled to said modulator to facilitate propagation to said monitoring assembly.

12. The system of claim 11, wherein said transmitter assembly produces radio frequency propagation of said propagated signal.

13. The system of claim 11, further comprising an ac blocking assembly operationally coupled to said transmitter, said ac blocking assembly facilitating transmission of said propagated signal through household electrical lines.

14. The system of claim 11, wherein said transmitter assembly modulates said propagated signal and propagates said propagated signal through telephone lines on a non-interference basis with telephone signaling.

15. The system of claim 11, wherein said transmitter assembly modulates said propagated signal and propagates said propagated signal through catv lines on a non-interference basis with catv signaling.

16. A system for monitoring computer usage, comprising:
    a computer having a video output producing a first video signal;
    a first display monitor configured to receive the first video signal and display video images from the first video signal; and
    a video tap assembly connecting the computer and the first display monitor and configured to pass the first video signal from the computer to the first display monitor, the video tap assembly being configured to produce a second video signal capable of producing on a second display monitor video images substantially identical to the video images produced on the first video display monitor;
    a transmitter assembly operationally coupled to said video tap assembly in a manner suitable to receive said secondary video signal from said video tap assembly, and said transmitter assembly being configured to propagate the second video signal as a propagated signal; and
    a monitoring assembly configured to receive the propagated signal at a location remote from the transmitter assembly, the monitoring assembly producing a video output representative of the first video signal such that the video output produces video images on a second display monitor corresponding to the video images displayed on the first display monitor.

17. The system of claim 16 additionally comprising a second video display operationally coupled to the monitoring assembly to receive the video output of the monitoring assembly to produce video images corresponding to the video images displayed on the first display monitor.

* * * * *